United States Patent [19]
Hickey

[11] Patent Number: 5,394,016
[45] Date of Patent: Feb. 28, 1995

[54] SOLAR AND WIND ENERGY GENERATING SYSTEM FOR A HIGH RISE BUILDING

[76] Inventor: John J. Hickey, 27 Bowdoin St., Apt. 4A, Boston, Mass. 02114

[21] Appl. No.: 241,769

[22] Filed: May 12, 1994

Related U.S. Application Data

[63] Continuation-in-part of Ser. No. 52,123, Apr. 22, 1993, Pat. No. 5,313,103.

[51] Int. Cl.$^6$ .......... F03D 9/00; F05D 11/00; H02N 6/00
[52] U.S. Cl. .......... 290/55; 136/246; 290/1 R; 290/44; 290/52; 415/4.1; 415/905; 415/909; 416/142; 416/223 R; 416/DIG. 4
[58] Field of Search .......... 136/246; 290/1 R, 44, 290/52, 55; 415/4.1, 905, 909; 416/142, 223 R, DIG. 4

[56] References Cited

U.S. PATENT DOCUMENTS

| | | | |
|---|---|---|---|
| 3,832,853 | 9/1974 | Butler, Jr. | 415/909 |
| 3,956,902 | 5/1976 | Fields, Jr. | 290/52 |
| 4,200,783 | 4/1980 | Ehret | 290/2 |
| 4,220,870 | 9/1980 | Kelly | 290/55 |
| 4,319,141 | 3/1982 | Schmugge | 290/52 |
| 4,668,841 | 5/1987 | Headrick | 136/246 |

FOREIGN PATENT DOCUMENTS

| | | | |
|---|---|---|---|
| 359556 | 9/1922 | Germany | 290/55 |
| 3049624 | 7/1982 | Germany | 290/55 |
| 3713233 | 11/1988 | Germany | 290/55 |
| 3844376 | 7/1990 | Germany | 290/55 |
| 303181 | 10/1992 | Japan | 290/55 |
| 157041 | 6/1993 | Japan | 290/55 |

OTHER PUBLICATIONS

Eldridge, Wind Machines, 1980, p. 73, p. 150.
Sullivan, Wind Machines, 1978, p. 10.

*Primary Examiner*—A. D. Pellinen
*Assistant Examiner*—Robert Lloyd Hoover
*Attorney, Agent, or Firm*—Daniel Bourque; Anthony Davis; Michael Bujold

[57] ABSTRACT

A solar and wind energy generating system for mounting to a building comprises a wind generator system including at least an auger shaped air engaging member. A plurality of wind generators having air engaging vanes may also be provided. The wind generating system intercepts the flow of air currents to produce mechanical energy which is transformed into electrical energy by an electric generator. The air engaging surface of the wind generator vanes or the auger include a plurality of surface deviations. The surface deviations are arranged in at least one predetermined pattern such as a plurality of radially extending deviation sets. The solar generator includes a plurality of solar energy collectors. The wind generators may further include air engaging vanes with at least one transparent surface, and a plurality of solar energy collectors within a cavity formed in the vane, thus forming a combined solar and wind energy generator. The wind and solar generators are stored within the building when not in use, and movable to a position exterior of the building when in use. The wind and solar energy generating system may be vertically or horizontally mounted, on or off a pedestal, and may be surrounded by a net like structure to prevent harm to birds.

31 Claims, 9 Drawing Sheets

SOLAR AND WIND ENERGY GENERATING SYSTEM FOR A HIGH RISE BUILDING

RELATED APPLICATIONS

This Application is a continuation-in-part of U.S. patent application Ser. No. 08/052,123, U.S. Pat. No. 5,313,103, entitled AUGER SHAPED FLUID MEDIUM ENGAGING MEMBER and filed Apr. 22, 1993, which is fully incorporated herein by reference.

FIELD OF THE INVENTION

This invention relates to high rise buildings such as skyscrapers and more particularly, to such buildings having a reduced dependency on its share of a regional or community generated energy source.

BACKGROUND OF THE INVENTION

The advent of safe elevators and increased horizontal city congestion have sent buildings reaching further and further into the sky. As buildings grow, however, so do their energy needs. Buildings in every major city consume a tremendous amount of energy which accordingly places a burden on and taxes energy supplies.

Such buildings, on the other hand, have an extremely large surface area which is constantly exposed to two sources of relatively free and renewable energy, namely, the wind and the sun. Indeed, some research suggests that solar heating systems become more efficient the larger the system. Accordingly, what is needed is a solar and wind energy generating system for a high rise building, to provide a dependable and reliable operating source of energy for its elevators and emergency lighting.

Conventional wind energy plants are presently used to generate consumer power in hilly or lofty regions offering high wind velocities and steady air currents. Both humans and birds compete for these same air currents, however, and these same areas and air currents are often bird migration corridors and nesting areas for many types of birds, including endangered predatory birds, such as bald eagles, golden eagles and peregrine falcons.

Further, the spinning blades of the wind turbines are a blur to the birds which concentrate intensely on catching their prey. Consequently, these wind farms become killing fields for birds, killing thousands of predatory birds captured in the spinning blades of the wind turbines. Bird killing will increase or keep pace with the global increase in conventional wind turbines. Although a netting enclosing wind generators may be contemplated, enclosing a conventional wind generator with 100 foot blades is truly a challenge if not generally impossible.

Thus, what is further needed is a solar and wind energy generating system which utilizes our renewable resources to produce energy without creating unnatural hazards for predatory birds. Additionally, utilization of an alternative form of wind and solar generating energy source such as an auger turbine and mounting solar energy generating apparatus on its components of fins and rudder, and including an auger shaped, fluid medium engaging member which is very visual for the predatory birds in flight, lessens the danger to the birds. Further, providing a protective netting around the auger shaped wind generators further enhances an already safer design and serves to further protect the birds from danger.

SUMMARY OF THE INVENTION

The present invention features a solar and wind energy generating system for a building. The solar and wind generating system includes a wind energy generating apparatus and a solar energy generating apparatus.

The wind energy generating apparatus includes a plurality of wind generators each of which is responsive to the flow of air currents for intercepting the flow of air currents and producing mechanical energy. An electric generator apparatus transforms the mechanical energy into electrical energy. The wind generators include a plurality of air engaging vanes having first and second surfaces. At least one of the first and second surfaces includes a plurality of surface deviations arranged as at least one surface deviation pattern including a plurality of deviation sets extending radially from a central point and forming the deviation pattern.

One embodiment of the wind energy generating apparatus further includes a frame structure which houses each wind generator. Across at least the front and rear surfaces of the frame structure is attached a netting utilized to prevent migrating or predatory birds such as eagles, hawks and falcons from being killed by following the air currents into the wind generator.

The solar energy generating apparatus includes a plurality of solar energy collectors, responsive to light energy striking the plurality of solar energy collectors, for transforming light energy into electrical energy.

In the preferred embodiment, the solar and wind generating apparatus of the present invention are movably mounted to the building and movable between a first stored position within the interior of the building, and a second useable position to the exterior of the building. The stored position within the interior of the building may include storage in a space between pairs of floors of the building or storage within the space of one floor of the building. Additionally, the wind and solar generating apparatus may have preferred positions of use such as a nearly horizontal position for the solar generating apparatus and a nearly vertical position for the wind generating apparatus.

Each of the wind generators comprising the wind generating apparatus may include its own separate electrical generator or alternatively, a plurality of wind generators may be mechanically coupled to a single electrical generator. Further, the wind generators may include spirally shaped blades or vanes. Additionally, the surface deviation patterns on the air engaging vanes may include spiral deviation sets radiating from a central deviation. The deviations may be convex or concave.

The air engaging vanes may further include one surface which is light energy transparent. The first and second surfaces of the air engaging vanes may form a cavity in which are disposed a number of solar energy collectors comprised of light sensitive cells. Thus, a wind generator may provide both wind generated and solar generated power.

An additional embodiment of the present invention contemplates utilizing an auger shaped fluid medium engaging member used in conjunction with the preferred embodiment. The auger shaped, fluid medium engaging member includes a helically shaped, outer region disposed about a longitudinal axis which passes through the central region of the fluid medium engaging member. The helically shaped outer region establishes at least one helically shaped fluid medium engaging surface. The auger shaped, fluid medium engaging member is adapted for rotational movement about its longitudinal axis which is effected by a flow of a fluid medium striking the helically shaped fluid medium engaging surface.

The auger shaped fluid medium engaging member may be positioned within the interior of the building between pairs of floors of the building or within the space of one floor of the building. The auger shaped fluid medium engaging member may be mechanically coupled to its own electrical generator or may be coupled with at least one of the other wind generators anticipated by this present invention. Further, a fluid medium flow deflector may be attached to the longitudinal axis of the auger shaped fluid medium engaging member for intercepting and diverting multidirectional air flow across the auger shaped fluid medium engaging member's surface.

In yet another embodiment, the auger shaped fluid medium engaging member may be mounted atop a pedestal on the top of a building. In this embodiment, the electrical generator system may further include a fluid medium funnel, which extends longitudinally parallel to the longitudinal axis of the auger shaped, fluid medium engaging member. The fluid medium funnel extends at least a length equal to the auger shaped, fluid medium engaging member, for intercepting the flow of a fluid medium and for converging the flow onto the fluid medium engaging surface of the auger shaped, fluid medium engaging member.

This embodiment further includes a rudder, also coupled proximate the auger shaped, fluid medium engaging member, for positioning the fluid medium funnel to intercept and to converge the flow of a fluid medium upon the fluid medium engaging surface. The fluid medium funnel and/or the rudder may include solar energy collectors to provide solar generated power.

An additional embodiment of the present invention contemplates a provision of a track over at least the top or roof of the building on which may travel frames or structures to which are mounted the wind and solar generating apparatus according to the present invention.

An additional feature of the present invention is that any surplus energy generated by the Solar and Wind Generating System for a High Rise Building of the present invention may be used in a recharging station located in or adjacent to the building to recharge the batteries of electric cars parked at the building.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
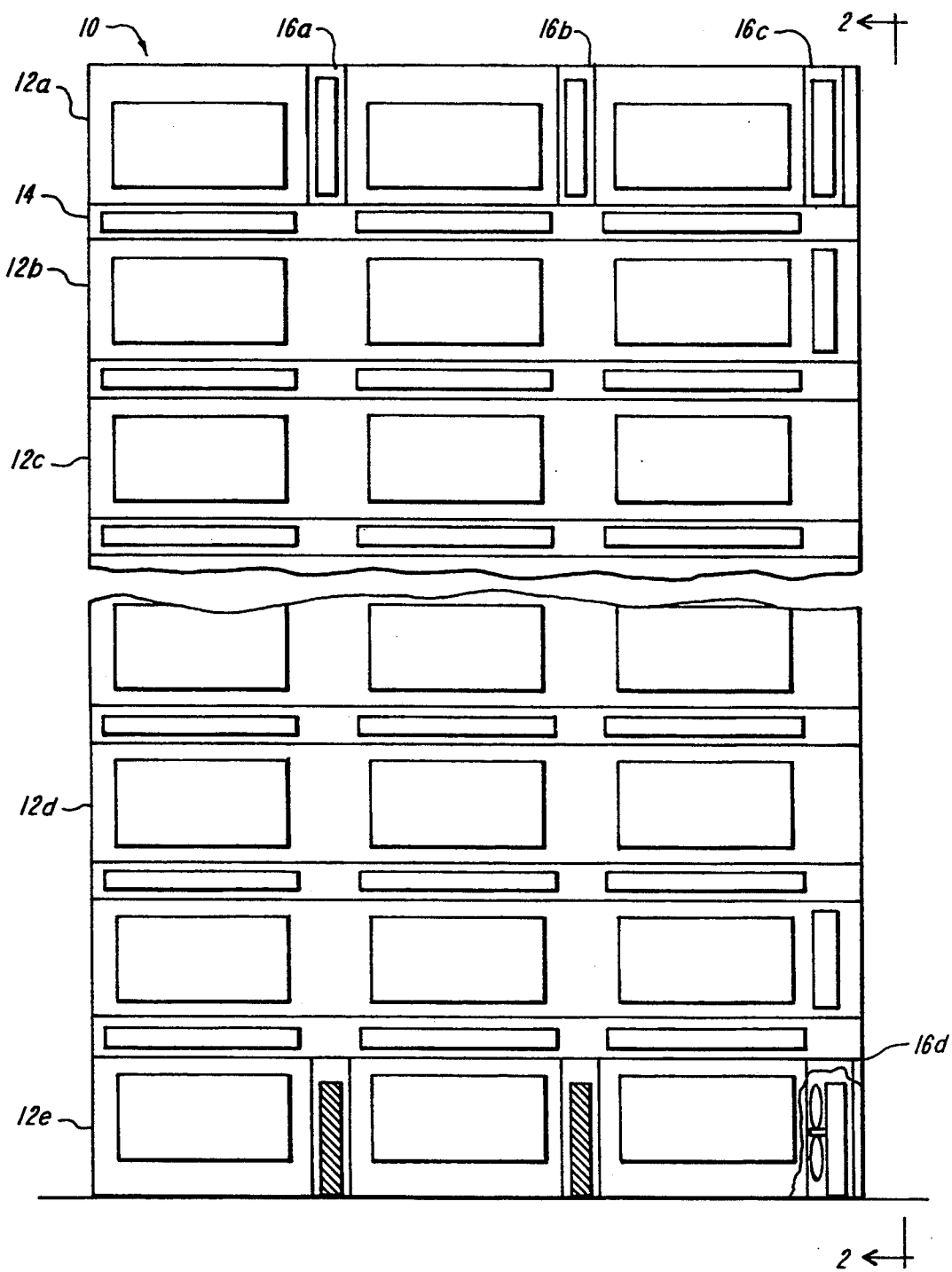
FIG. 1 is a front perspective view of a building with a solar and wind energy generating system according to the present invention.

The present invention features a solar and wind energy generating system for a building 10, FIG. 1, including a number of floors or occupied levels such as floors 12a–12e. Adjacent pairs of floors such as floors 12a and 12b are separated by a region or space 14 which forms a storage area for the system of the present invention when not in use as will be explained in greater detail below.

The present solar and wind energy generating system for a building is comprised of two components, namely, a wind energy generating apparatus and a solar energy generating apparatus. In the preferred embodiment, the solar and wind generating apparatus are movably mounted to the building 10 such that they can be moved between a first, stored position, within the interior of the building, and a second, useable position exterior to the building.

The first stored position within the interior of a building includes region 14 between floors 12a and 12b in which case the solar or wind generating apparatus are preferably stored horizontally, or alternatively stored within a vertical region or pocket of the building such as regions 16a–16d, in which case the solar or wind generating apparatus are preferably stored in a vertical position.

In both cases, the solar or wind generating apparatus are mounted to or disposed on a frame structure which includes a mechanism for facilitating the movement of the frame structure between the first stored position within the interior of the building to a second useable position to the exterior of the building. Various mechanical means such as tracks and wheels or other similar means whether operated mechanically by means such as cable and pulley or electrically by means of an electric motor controlled manually or electronically, are well known to those skilled in the art and are considered to be within the scope of the present invention.

Figure 2:
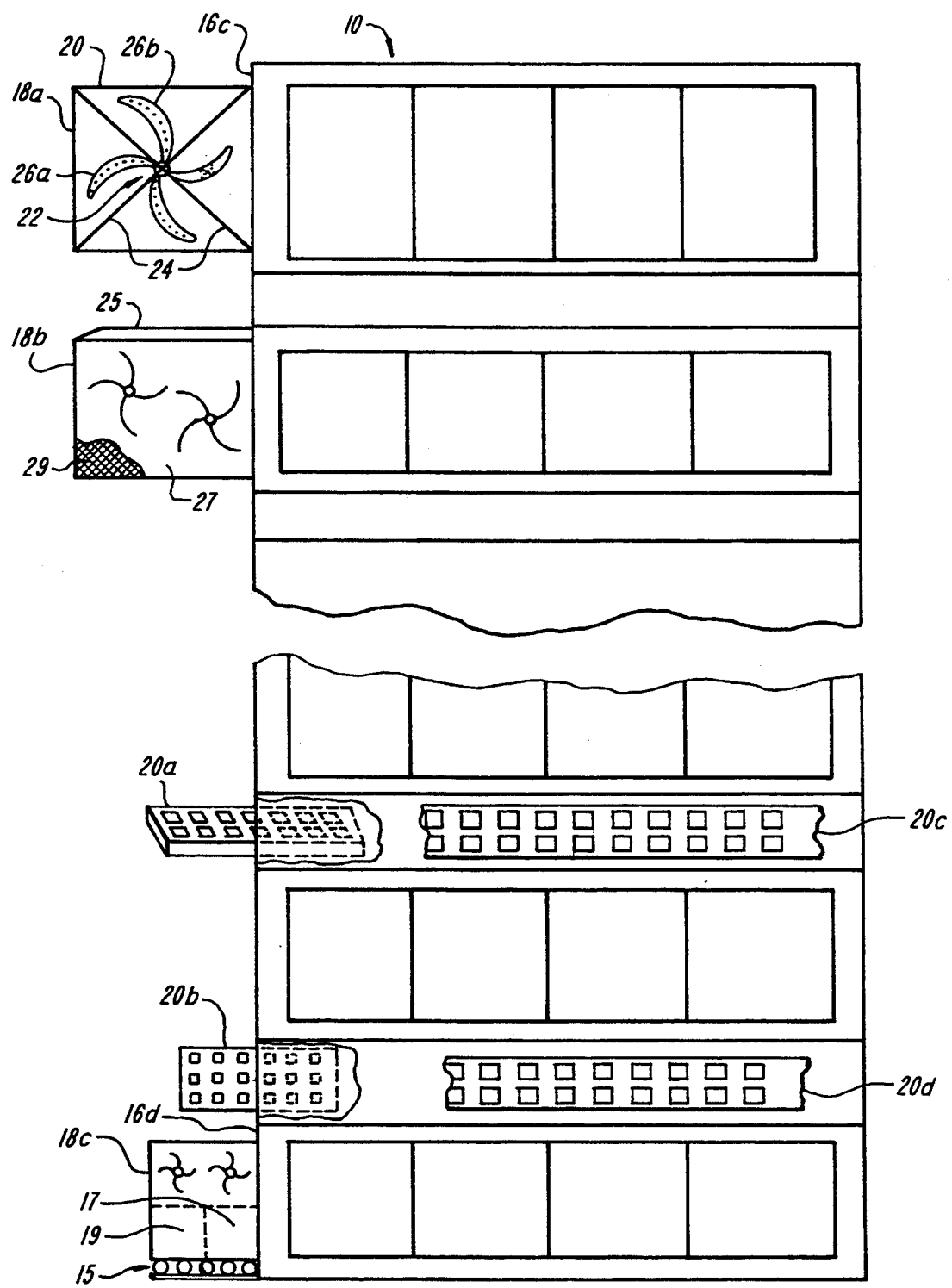
FIG. 2 is a side view of the building with solar and wind generating apparatus of FIG. 1.

As previously discussed, the present solar and wind energy generating system includes both a plurality of wind generating apparatus 18a–18c, FIG. 2, as well as a plurality of solar energy generating apparatus such as apparatus 20a and 20b. A plurality of solar energy generating apparatus may be provided, such as apparatus 20c and 20b configured as a band including a plurality of solar collectors which wrap around building 10.

The wind energy generating apparatus 18a includes a frame structure 20 housing at least one wind generator 22 which is coupled to frame 20 by means such as crossmembers 24. The frame structure 20 may further include a netting element 29 or other passage restrictive means across the front and rear surfaces 25, 27 of the frame structure 20 to prevent birds from nesting, being harmed or otherwise entering the frame structure 20, but not restrict the flow of air currents into the wind generating apparatus.

The wind generator 22 includes a plurality of air engaging vanes such as vanes 26a and 26b which, in the preferred embodiment, have a curved or spiral shape. The air engaging vanes are rotatably supported by the hub of the wind generator 22 and are operative for intercepting the flow of air currents and producing rotational mechanical energy. In the preferred embodiment, each wind generator includes an electric generator apparatus built into the wind generator or disposed in the interior of the building, for transforming the rotational mechanical energy produced by the air engaging vanes into electrical energy. Alternatively, one or more wind generators may be coupled by mechanical means such as drive shaft or belt and pulley to an electrical generator apparatus located on the frame or inside the building, to transform the mechanical energy into electrical energy.

Further, the air engaging vanes 26a, 26b of the preferred embodiment of the wind generator 22 include at least first and second surfaces. At least one of the first and second surfaces includes a plurality of surface deviations arranged as a number of deviation sets to form at least one deviation pattern. The deviation sets preferably extend radially from a central point for forming the surface deviation pattern. The deviation sets may be curved or straight and may include concave or convex deviations.

Examples of such surface deviations which serve to alter or control the flow of a fluid medium relative to the air engaging vanes are disclosed in U.S. Pat. Nos. 4,872,484 and 4,974,633 issued to the present inventor and fully incorporated herein by reference. Further, one or more surface deviations of the surface deviation pattern may itself include a surface deviation pattern comprised of a plurality of deviation sets as also disclosed in U.S. Pat. No. 4,974,633 mentioned above.

In an additional embodiment, air engaging vanes 26a, 26b of wind generator 22 may include one surface which is light transparent. The first and second surfaces of the air engaging vane form a cavity in which may be disposed one or more solar cells, thus allowing the wind generator to be both a combination solar and wind powered generator. An example of such a combined solar and wind powered generator is disclosed in greater detail in U.S. Pat. No. 5,075,564 which is incorporated herein by reference.

An additional embodiment of the present invention includes at least one of a wind generating apparatus such as wind generating apparatus 18c, or a solar generating apparatus located at ground level. The wind or solar generating apparatus 18c includes wheels or rollers 15 which roll on the sidewalk or ground region near the building 10. If the wind or solar generating apparatus will traverse a pedestrian walkway or sidewalk, the wind or solar generating apparatus will also include a pedestrian walkway region 17 and/or 19 through which pedestrians may pass.

Figure 3:
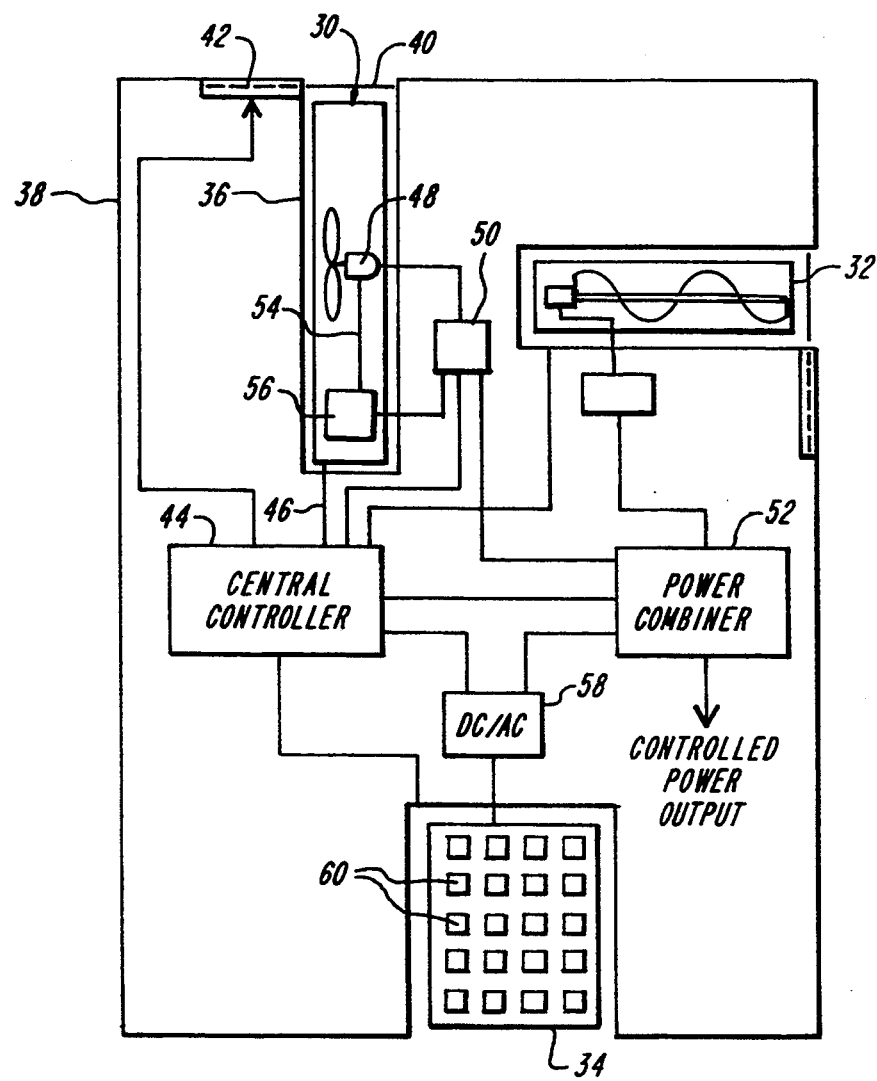
FIG. 3 is a top, cross-sectional view of a building with the wind and solar generating system according to the present invention.

Additional details of one embodiment of the present system are shown in FIG. 3 which includes first and second wind generating apparatus 30, 32 respectively and one solar energy generating apparatus 34. Wind generating apparatus 30 is disposed within a pocket or cavity 36 which is generally completely contained within one floor 38 of the building. The pocket or cavity 36 may include a door 40 which is movable under control of central controller 44 between a first closed position preventing wind, rain, snow and ice from entering the wall pocket or cavity when the system is not in use, and for also enhancing the building's aesthetics. Door 40 is also movable to an open position shown by dashed line 42 when it is desired to utilize the system.

A central controller 44 may also be provided in one or multiple locations within the building and includes a data signal path such as data signal path 46 to each wind generating apparatus such as apparatus 30, for controlling opening and closing of pocket door 40, as well as movement of the wind and solar generators such as wind generating apparatus 30 in and out of the wall pocket from the stored to the used position.

Wind generating apparatus 30 includes at least one wind generator 48 which in the preferred embodiment includes an electric energy receiver which may be coupled to an electric power receiving unit 50 which may be connected to one or more electric generators 48. Electric current (typically an AC current) is subsequently directed to an electric power combiner and distribution unit 52 which may include a transformer to provide a controlled power output. Alternatively, wind energy receives 48 may simply turn a shaft 54 which in turn is coupled to an electric power generator 56 for converting the rotational, mechanical energy from wind generator 48 into electric power which is then provided to distribution unit 50.

Central controller 44 is similarly connected to solar energy generating apparatus 34 for opening and closing any pocket or cavity doors which contain the apparatus, and for directing the apparatus to move from the stored position to the used position exterior of the building.

In the preferred embodiment, the solar energy generating apparatus 34 is positioned horizontally and located between pairs of adjacent floors of the building. Additionally, solar energy generating apparatus 34 is preferably coupled to a dc to ac converter 58 which converts the dc power typically generated by the solar cells 60 of the solar generating apparatus 34 to ac power to be provided to distribution unit 52.

Although solar and wind generating apparatus may be conveniently stored between pairs of floors of a building or within a pocket or segment of one floor of a building, the present invention also contemplates the use of one frame or structure to provide both the solar and wind generating apparatus according to another embodiment of the present invention.

Figure 4:
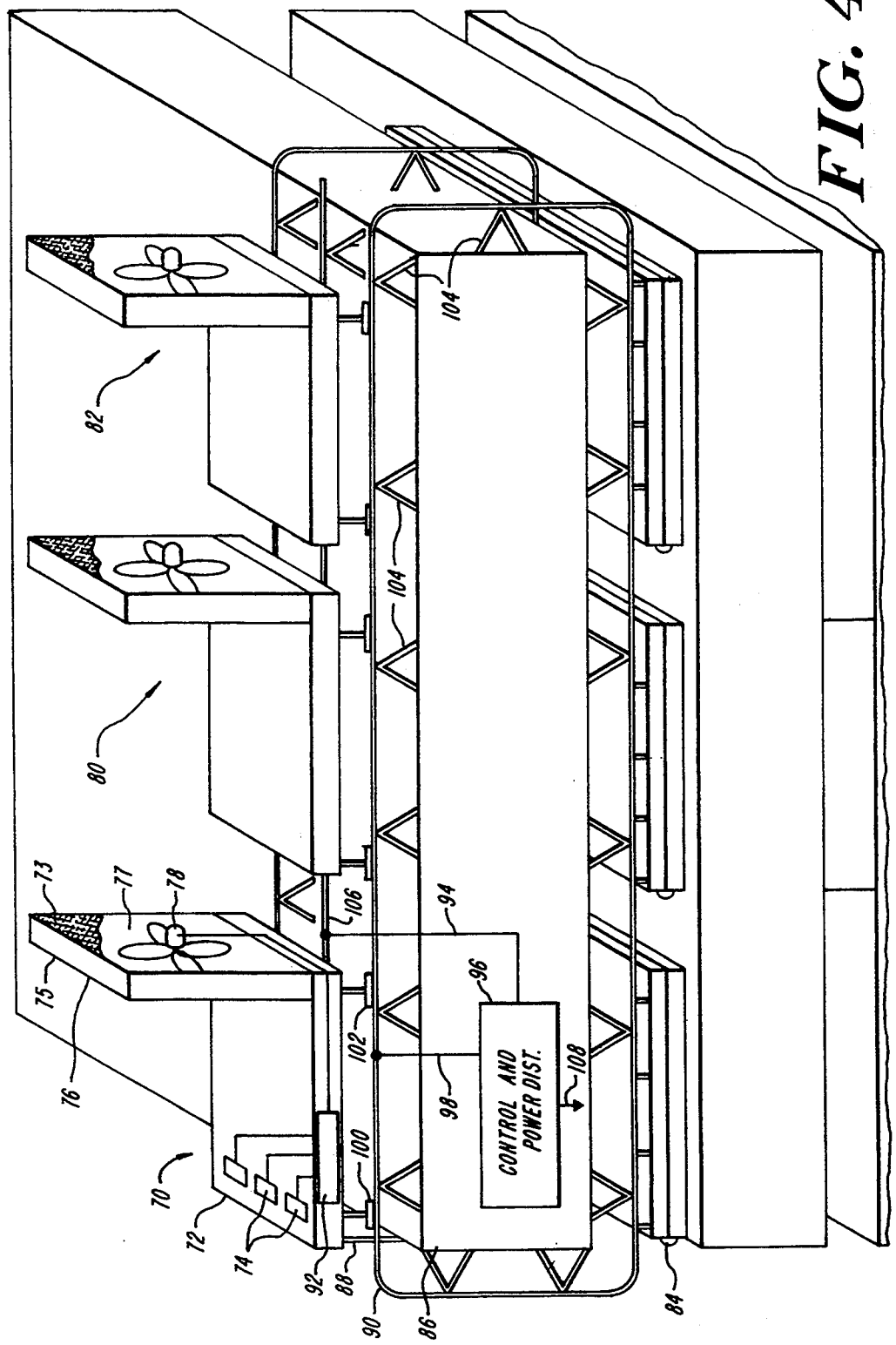
FIG. 4 is a front perspective view of an additional building mounting method for the top of a building, for the wind and solar energy generating system of the present invention.

As shown in FIG. 4, frame structure 70 includes a solar energy generating portion 72 including a plurality of solar energy collectors 74 as well as a wind energy generating portion 76 including at least one wind generator 78. Frame structure 70 further includes a netting element 73 or other passage restrictive means across the front and rear surfaces 75, 77 of the wind energy generating portion 76 to prevent birds from nesting, being harmed or otherwise entering the wind energy generating portion 76, but not restrict the flow of air currents into the wind generating apparatus. Other combined solar and wind generating apparatus such as those shown at 80 and 82 are similarly provided.

In this embodiment, the solar and wind generating portions of the apparatus are hinged proximate one edge as shown generally at 84 to facilitate folding of the apparatus for storage beneath the top floor 86 of the building.

Each combined solar and wind generating apparatus is movably coupled to first and second rails 88 and 90 respectively, to allow the units to be moved between a first stored position under the top floor 86 of the building, to a useable position on the roof of the building. The combined wind and solar generating apparatus are coupled to the first and second tracks 88 and 90 and in addition, may include a small motor or drive mechanism 100, 102, for facilitating movement of the apparatus or frame from the stored to the usable position. Additionally, rails 88 and 90 may be supported by a number of support structures 104. Such rail structures with movable elements or frames on the rails are well known to those skilled in the art.

Additionally, the apparatus may include an ac to dc converter 92 which is coupled to each of the solar cells 74, for converting dc power generated by the solar cells to more usable ac power. Electric power may then be coupled to one of the tracks 88 or 90 or alternatively, to a third rail 106 which is utilized solely for conducting electricity. Similarly, wind generator 78 may be coupled by means of data signal path 94 to one of the first and second rails or alternatively, to the third power conducting rail 106. All power may then flow to a central distribution unit 96 for providing controlled power output. Distribution unit 96 may also provide control signals over data signal pad 98 to the motors 100, 102 of the combined solar and wind generating apparatus, for controlling movement of the apparatus. Further, a control unit 96 may also control motors (not shown) which control deployment of wind generating apparatus 76 from the folded or stored position to the open or deployed position once the apparatus reaches the tops of the roof.

Figure 5:
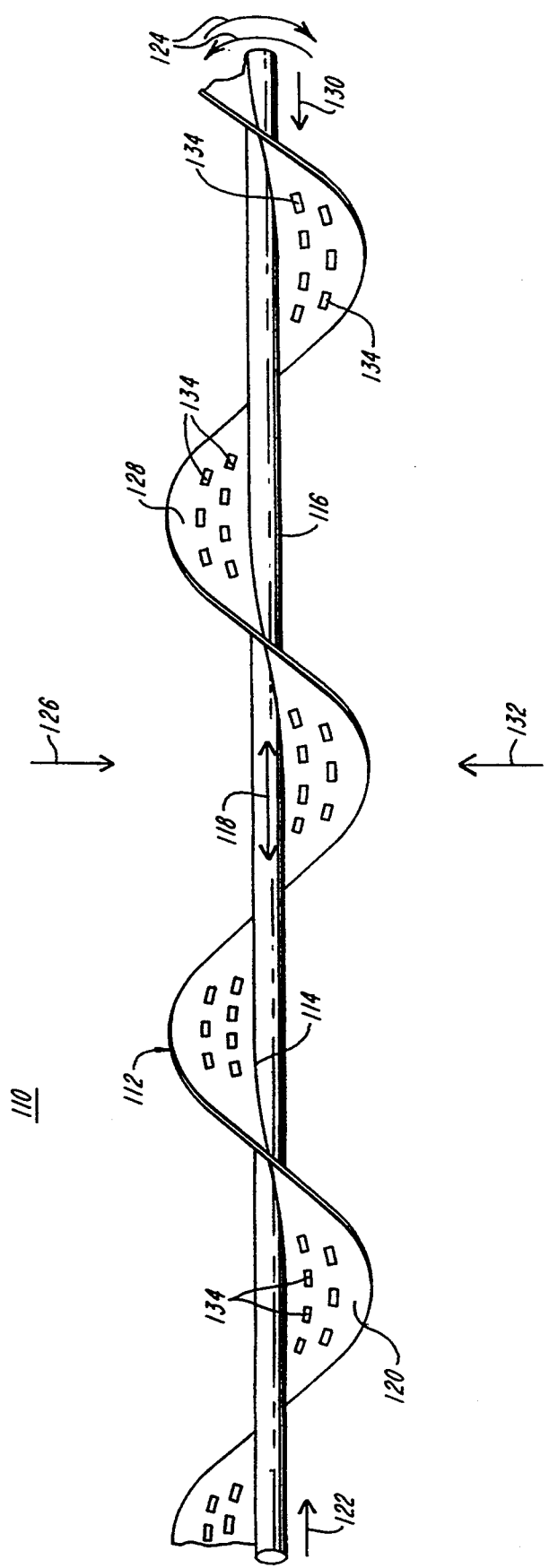
FIG. 5 is a perspective view of an auger shaped fluid medium engaging member for use as a wind generating apparatus in conjunction with the present invention.

An additional embodiment of the present invention includes the utilization of an auger shaped fluid medium engaging member 110, FIG. 5, in conjunction with at least one of the energy generating systems discussed above. An auger shaped fluid medium engaging member as contemplated by this invention is illustrated in U.S. Pat. No. 5,313,103 by the inventor and fully incorporated herein by reference.

The helically shaped outer region 112 establishes at least one helically shaped fluid medium engaging surface 120 about the length of the fluid medium engaging member 116. A fluid medium, such as air or water, which originates from a direction parallel to the auger as indicated generally by arrow 122, will be intercepted by the fluid medium engaging surface 120 and will cause the auger shaped, fluid medium engaging member 110 to rotate about the longitudinal axis 118 as shown generally by arrows 124. Additionally, a fluid medium striking the at least one fluid medium engaging surface 120 from a direction normal to the auger as indicated generally by arrow 126, will also impart the same rotational movement on the auger shaped, fluid medium engaging member 110.

In another embodiment, the auger shaped, fluid medium engaging member may include a second fluid medium engaging surface 128 which will intercept the flow of a fluid medium from the directions indicated generally by arrows 130 and 132 to cause the auger shaped, fluid medium engaging member 110 to rotate as indicated by arrows 124.

In order to facilitate and enhance the effects of a fluid medium such as air or water upon the auger shaped, fluid medium engaging member 110, and to thus impart more rotational movement on the auger shaped fluid medium engaging member, the first or second fluid medium engaging surfaces 120, 128 may include a plurality of surface deviations 134.

Figure 6:
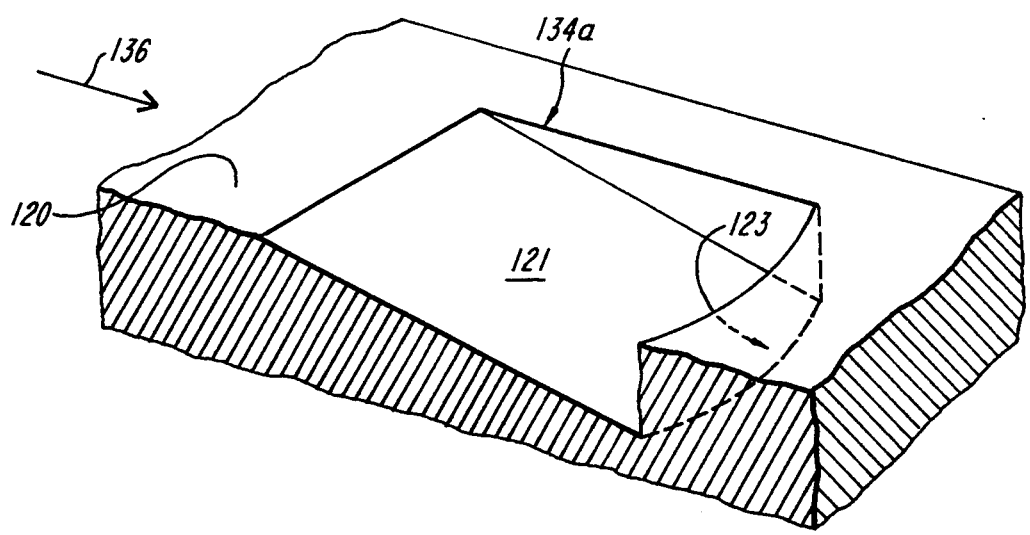
FIG. 6 is a perspective view of a first embodiment of a surface deviation on the fluid medium engaging surface of the auger shaped fluid medium engaging member of FIG. 5.

As shown in greater detail in FIG. 6, one embodiment of the fluid medium engaging surface deviations 134 includes a "wedge" or semi-conically shaped deviation 134a which greatly enhances the effects of a fluid medium striking the fluid medium engaging surface from the direction indicated generally by arrow 136.

Figure 7:
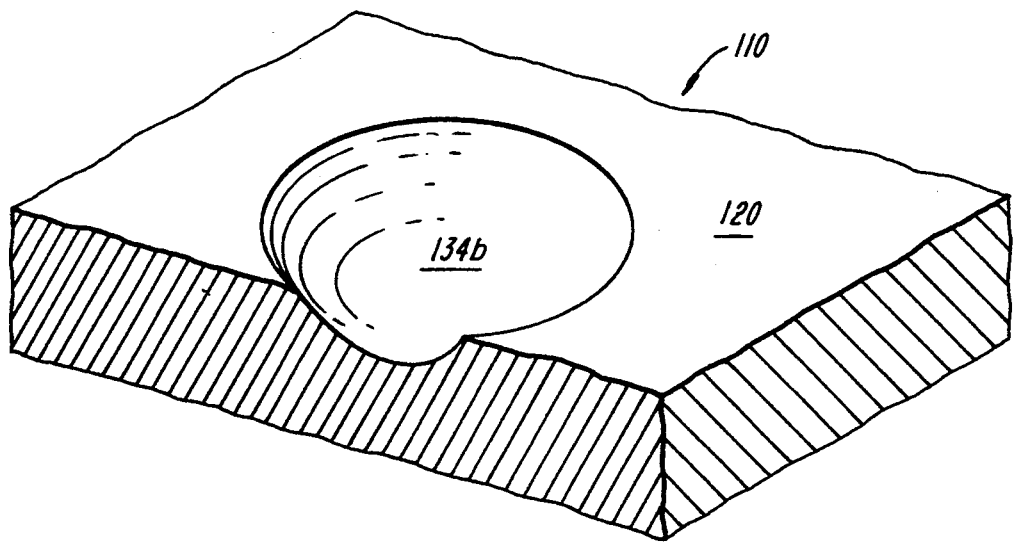
FIG. 7 is a perspective view of a second embodiment of a surface deviation on the fluid medium engaging surface of the auger shaped fluid medium engaging member of FIG. 5.

In an alternative embodiment, the fluid medium engaging surface 120 may include a generally circular, concave deviation 134b, FIG. 7. This circular shaped surface deviation also greatly enhances the effects of a fluid medium striking or contacting the fluid medium engaging surface 120 of the auger shaped fluid medium engaging member 110. In contrast, however, to the conically or wedged shaped surface deviation 134a previously described, the concave, generally circular shaped surface deviation 134b is more unidirectional in its ability to intercept the flow of a fluid medium from generally any direction, to thereby enhance the effects of the fluid medium on the auger shaped, fluid medium engaging member 110.

Figure 8:
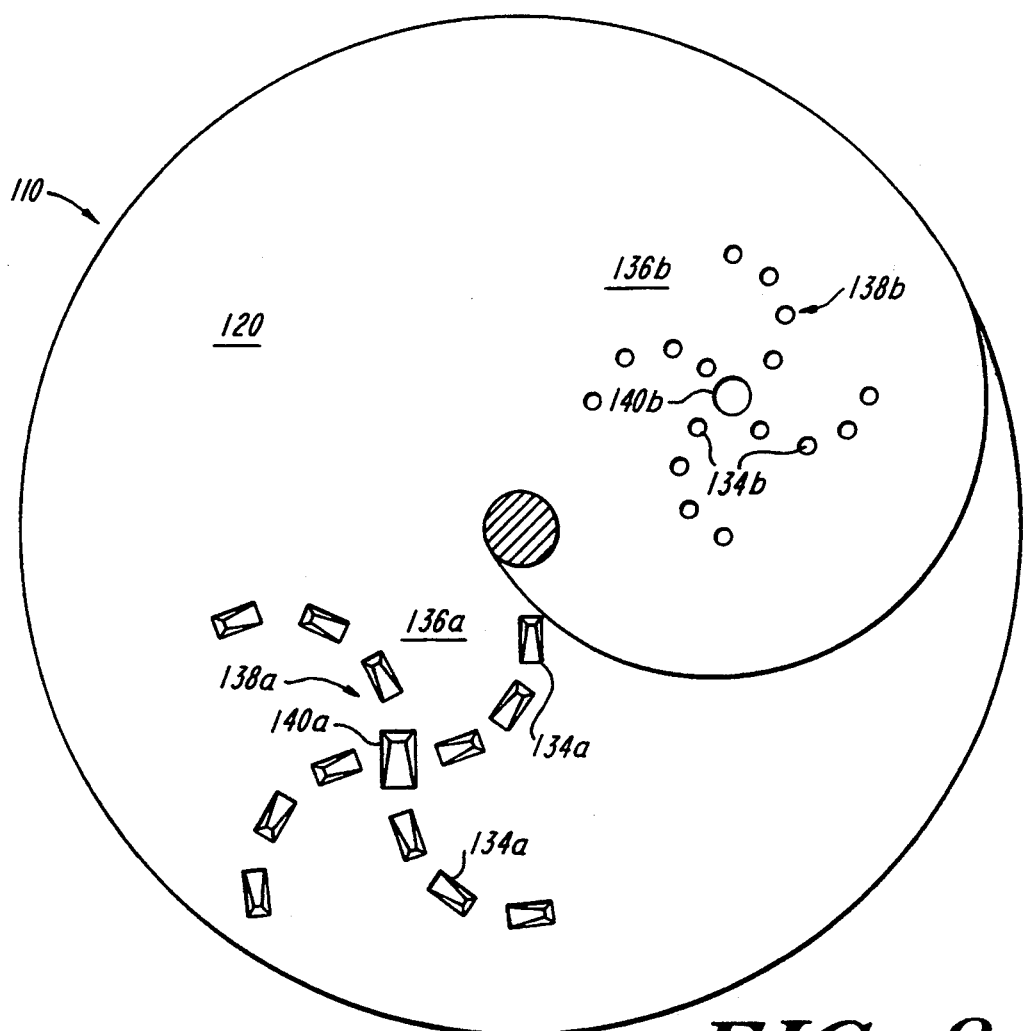
FIG. 8 is an end view of the fluid medium engaging surface of an auger shaped fluid medium engaging member according to one embodiment of the present invention illustrating the surface deviations according to the first and second embodiments illustrated in FIGS. 6 and 7 and arranged in a predetermined surface deviation pattern.

In yet another embodiment, illustrated in FIG. 8, a plurality of surface deviations 134a, 134b may be grouped into one or more surface deviation patterns 136a, 136b. These patterns may be spirally formed, including one or more deviation sets, such as deviation sets 138a, 138b, each comprising a number of surface deviations 134a, 130b. The deviation sets 138a, 138b typically radiate outwardly, from a common central deviation 140a, 140b. Additionally, the deviation sets may be straight, or curvilinear, when extending from the common central deviation. Additional details of such surface deviations and surface deviation sets may be found in Applicant's U.S. Pat. Numbers 4,872,484; 4,974,633 and 5,075,564 incorporated herein by reference.

Figure 9:
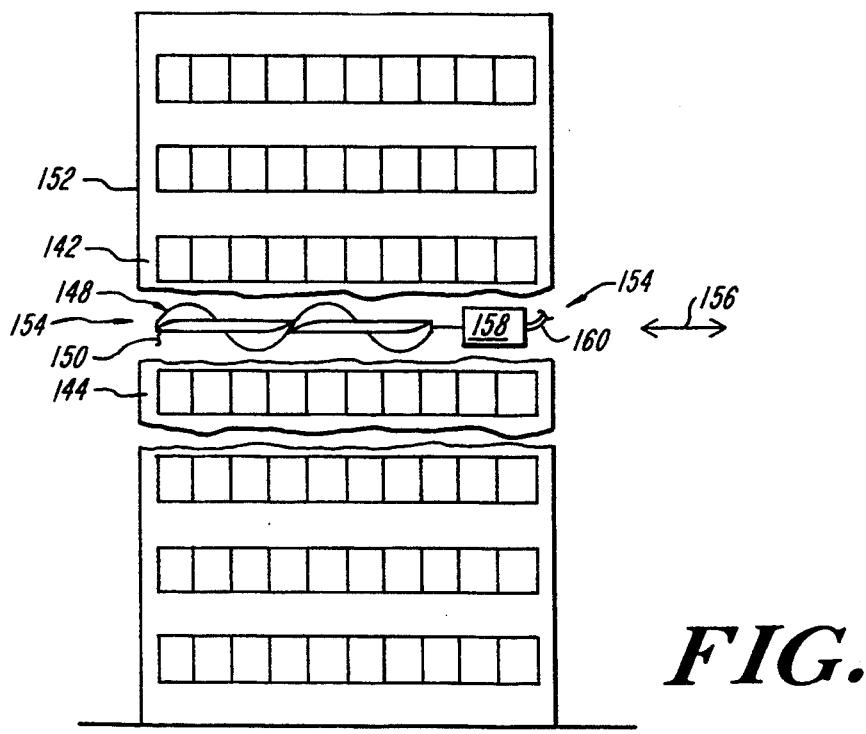
FIG. 9 is a perspective view of a high rise building, including a cut out region illustrating the electrical generator system with auger shaped fluid medium engaging member according to yet another embodiment of the present invention, mounted in a horizontal position between floors of the high rise building.

The auger shaped, fluid medium engaging member of the present invention may be utilized in conjunction with an electrical generator, to form an electrical energy generating system having an auger shaped, fluid medium engaging member, which allows such an electrical generating system to operate when oriented horizontally, in a closed area, such as in the space between floors 142, 144, FIG. 9. In this embodiment, the horizontally oriented electrical generating system with auger shaped, fluid medium engaging member 148, is disposed in the space 150 between floors 142 and 144. The exterior of the building 152 is provided with one or more openings 154 which allows wind to enter the region 150 between floors 142 and 144 from either direction indicated generally by arrow 156, parallel to the longitudinal axis of the auger shaped, fluid medium engaging member and electrical generating system 148.

Figure 10:
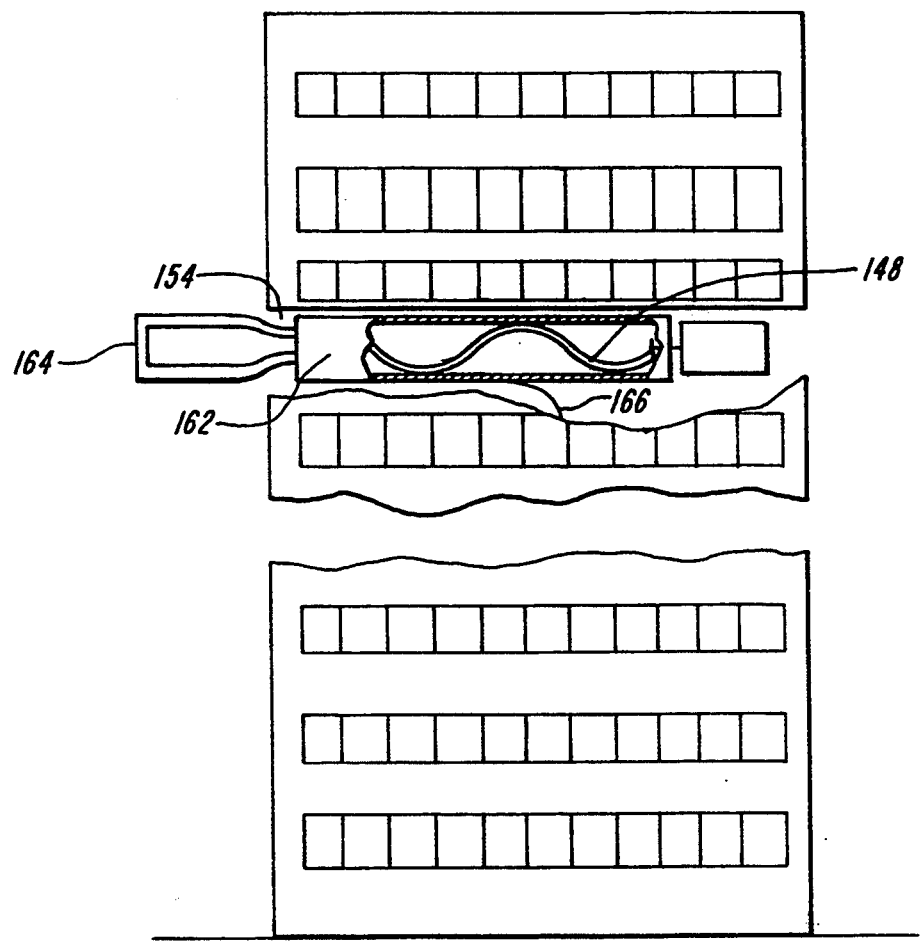
FIG. 10 is a perspective view of the horizontally mounted electrical generator system with auger shaped fluid medium engaging member of FIG. 9 including a wind funnel or deflector.

An additional feature of this embodiment is a tubular fluid medium funnel member 162, FIG. 10, which encapsulates or surrounds the auger shaped medium engaging member 148, to ensure passage of the air flow across the auger shaped medium engaging member 148.

Also contemplated by this embodiment is a rotatable or multiple fixed position fluid medium deflector 164 for intercepting and diverting the multi-directional airflow across the longitudinal axis of the auger shaped fluid medium engaging member 148. The deflector 164 may be rotated about the longitudinal axis of the auger shaped fluid medium engaging member 148 as desired to best intercept the air flow by a data signal path 166 coupled to the central controller 44 shown in FIG. 3. The deflector 164 may be a curved or concave configuration, although additional configurations are contemplated by this embodiment. The fluid medium deflector 164 may also be fixed in position above, below, to the left or to the right of opening 154, to direct the flow of the fluid medium across the fluid medium engaging member 148.

In this embodiment, tall buildings such as skyscrapers which are nearly always buffeted by constant strong winds may take advantage of this free renewable energy source. The winds will cause the auger shaped, fluid medium engaging member to rotate about its longitudinal axis. Referring back to FIG. 9, this rotation will in turn rotate electrical generator 158 which will produce electrical energy which is then distributed throughout the building by a means of one or more cables 160.

Figure 11:
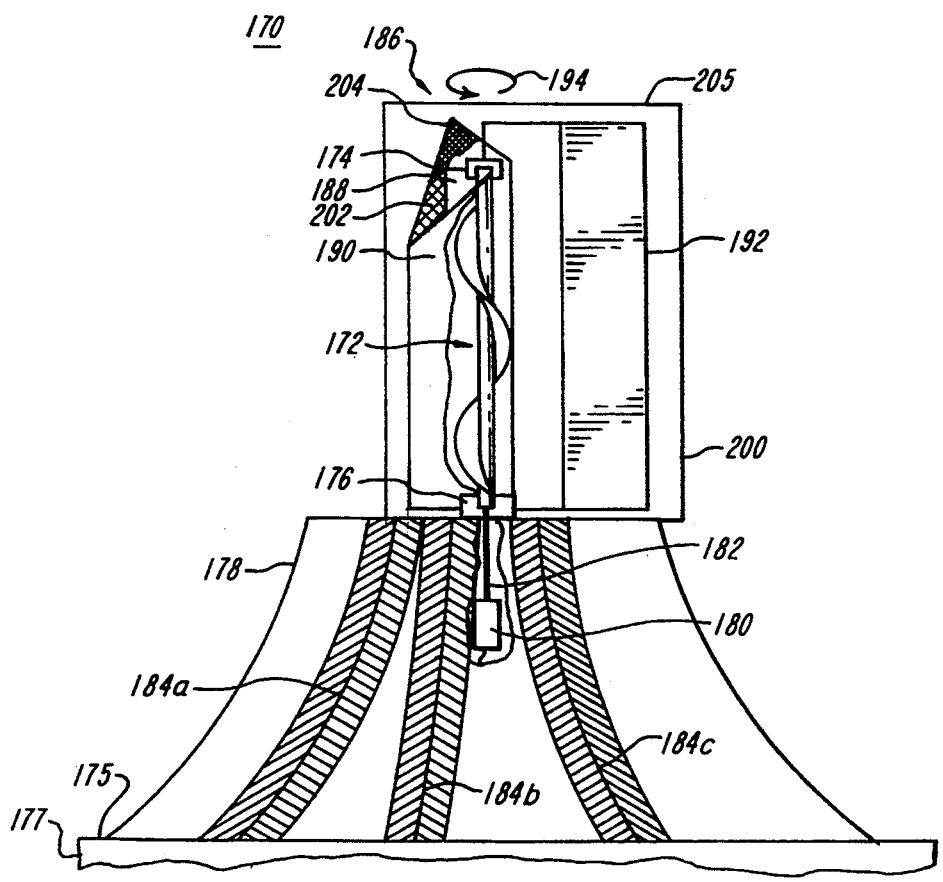
FIG. 11 is a perspective view of a vertically mounted electrical generator system including an auger shaped fluid medium engaging member according to a further embodiment of the present invention mounted atop a support pedestal on the top of a high rise building.

In yet another embodiment, the versatility of the auger shaped, fluid medium engaging member of the present invention in combination with an electrical generator apparatus 180 is illustrated in a vertically mounted electrical generating system 170, FIG. 11. In this embodiment, the auger shaped, fluid medium engaging member 172 is mounted vertically atop support pedestal, 178, to the roof top 175, and adapted for rotational movement by means of first and second support members 174, 176 which include bearings or other similar means to allow the auger shaped, fluid medium engaging member 172 to rotate about its longitudinal axis. Support pedestal 178 may also include one or more ridges 184a–184c, which serve to intercept the flow of air striking the pedestal 178, and direct the air flow upwardly across and into the auger shaped, fluid medium engaging member 170.

The auger shaped, fluid medium engaging member 170 which forms part of the electrical generator system of the present invention is mounted atop a building 177. Inside the building 177 is disposed electrical generator apparatus 180 which is coupled to the auger shaped, fluid medium engaging member 172 by means of shaft or similar means 182.

The electrical generating system of this embodiment further includes a fluid medium funnel 186 comprised of first and second funnel members 188, 190. The first and second fluid medium funnel members are oriented at approximately a 90 degree angle, generally perpendicular to one another, to facilitate directing the air into the auger shaped, fluid medium engaging member 172. A netting element 202, 204 or other passage restrictive means may be coupled to the front and top faces formed by first and second funnel members 188, 190 without restricting the air flow across the auger shaped fluid medium engaging member 172.

An additional feature of this embodiment is a rudder 192, coupled to the system of the present invention. Rudder 192 serves to keep the fluid medium funnel 186, which is rotatable about the longitudinal axis of the auger shaped, fluid medium engaging member 172, pointed directly into the wind.

Figure 12:
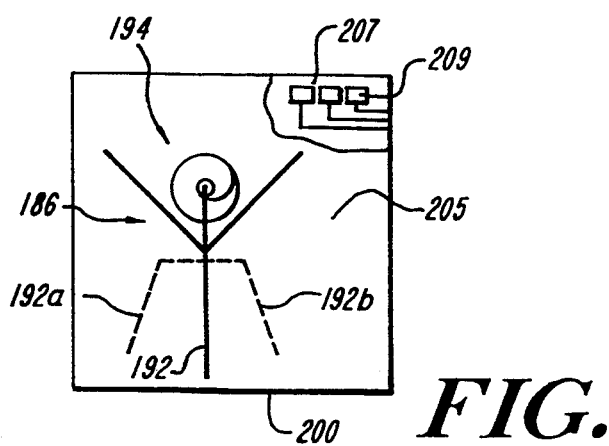
FIG. 12 is a top view of the vertically mounted auger shaped fluid medium engaging member and electrical generator system of FIG. 11.

In the alternative embodiment illustrated in FIG. 12, rudder 192 may instead take the form of a two piece straight or angled rudder including first and second rudder members 192a, 192b, coupled proximate a region opposite from the opening 194 of the fluid medium funnel 186.

An additional feature of this embodiment is an open-sided frame structure 200 which encloses the electrical generating system of this embodiment but allows the passage of the air flow across the auger shaped fluid medium engaging member 172. The open-sided frame structure 200 comprises a solid top surface 205 which includes a solar energy generating portion 207 including a plurality of solar energy collectors 209, FIG. 12, such as solar cells, and may be utilized in a system similar to the apparatus shown in FIG. 4 depicting frame structure 70 including a solar energy generating portion 72. Those skilled in the art will recognize that rudder 192 and fluid medium funnel 186 may also include solar energy collectors 209.

Although some features of the present invention have been shown in combination with other features, each feature may be utilized alone or combined with another feature without departing from the scope of the present invention.

Modifications of the presently disclosed invention will become apparent to those skilled in the art with the benefit of the foregoing description, and are considered to be within the scope of the present invention.

What is claimed is:

1. A solar and wind energy generating system for mounting to a building, comprising:

at least one wind energy generating apparatus including:

at least one auger shaped fluid medium engaging member, for effecting rotational movement in an electrical generator by intercepting the flow of a fluid medium, said auger shaped fluid medium engaging member mounted to a building;

said at least one auger shaped fluid medium engaging member including a helically shaped outer region disposed about a longitudinal axis which passes through a central region of said at least one auger shaped fluid medium engaging member, said helically shaped outer region establishing at least one helically shaped fluid medium engaging surface, said at least one auger shaped fluid medium engaging member adapted for rotational movement about said longitudinal axis, said flow of a fluid medium effecting said rotational movement of said at least one auger shaped fluid medium engaging member upon striking said at least one helically shaped fluid medium engaging surface, for effecting rotational movement of said at least one auger shaped fluid medium engaging member; and an electrical generator, coupled to said at least one auger shaped fluid medium engaging member and responsive to said rotational movement, for generating electrical energy upon rotation of said electrical generator caused by said rotational movement of said at least one auger shaped fluid medium engaging member; and a solar energy generating apparatus including a plurality of solar energy collectors, responsive to light energy striking said plurality of solar energy collectors, for transforming light energy into electrical energy.

2. The system of claim 1, wherein said at least one helically shaped fluid medium engaging surface includes a plurality of surface deviations, for enhancing said rotational movement of said at least one auger shaped fluid medium engaging member effected by said flow of a fluid medium.

3. The system of claim 2, wherein said plurality of surface deviations include wedge-shaped deviations.

4. The system of claim 1, wherein said at least one auger shaped fluid medium engaging member is mounted vertically to said building.

5. The system of claim 4, further including a fluid medium funnel coupled proximate a first end of said at least one auger shaped fluid medium engaging member, for intercepting said flow of a fluid medium and for converging said flow of said fluid medium upon said at least one helically shaped fluid medium engaging surface of said at least one auger shaped fluid medium engaging member.

6. The system of claim 5, further including a rudder, coupled proximate a-second end of said at least one auger shaped fluid medium engaging member opposite from said fluid medium funnel, for urging said fluid medium funnel into a direction parallel to a direction of said flow of a fluid medium, and for positioning said fluid medium funnel to intercept and converge said flow of a fluid medium upon said at least one helically shaped fluid medium engaging surface.

7. The system of claim 4, wherein at least said auger shaped fluid medium engaging member is covered by a protective net member.

8. The system of claim 1, wherein said auger shaped fluid medium engaging member is mounted in a horizontal position between a pair of adjacent floors of said building.

9. The system of claim 8 further including a fluid medium flow deflector for intercepting said flow of a fluid medium, said fluid medium flow deflector including a tubular fluid medium funnel member surrounding said auger shaped fluid medium engaging member, for directing said flow of a fluid medium across said auger shaped fluid medium engaging member.

10. The solar and wind energy generating system of claim 1, wherein said at least one wind energy generating apparatus further includes:

a plurality of wind generators, each of said plurality of wind generators including a plurality of air engaging vanes having at least first and second surfaces, said air engaging vanes rotatably supported by said wind generator and operative for intercepting a flow of air currents for producing mechanical energy;

electric generator apparatus, coupled to each of said plurality of wind generators, for transforming said mechanical energy into electrical energy; and at least one of said first and second surfaces of each of said plurality of air engaging vanes including a plurality of surface deviations arranged in at least a first surface deviation pattern, said at least first surface deviation pattern including a plurality of deviation sets extending radially from a central point for forming said surface deviation patterns.

11. A system of claim 10 wherein said wind energy generating apparatus and said solar energy generating apparatus are movably mounted to said building, so as to be movable between a first stored position within the building, and a second useable position exterior of the building.

12. The system of claim 11 wherein said first stored position includes a region between pairs of adjacent floors of said building.

13. The system of claim 12 wherein at least one of said solar energy generating apparatus and said wind energy generating apparatus are stored horizontally between pairs of adjacent floors of said buildings.

14. The system of claim 11 wherein said first stored position includes a region within one floor of said building.

15. The system of claim 14 wherein at least one of said solar energy generating apparatus and said wind energy generating apparatus are stored vertically within said one floor of said building.

16. The system of claim 15 wherein at least one of said solar and wind energy generating apparatus are mounted to a vertical frame, and wherein said vertical frame is disposed at ground level and includes at least one pedestrian walkway region.

17. The system of claim 11 wherein said solar generating apparatus are movably mounted horizontally and said wind generating apparatus are movably mounted vertically to said building respectively.

18. The system of claim 11 wherein said solar energy generating apparatus and said wind generating apparatus are mounted to one frame structure; and wherein said frame structure is movably coupled to a track, for traversing at least a roof area of said building.

19. The system of claim 10 wherein a plurality of said wind generators are coupled to one electric generator apparatus.

20. The system of claim 10 wherein said plurality of wind generators include a plurality of curved air engaging vanes.

21. The system of claim 10 wherein said deviation sets include spirally shaped deviation sets.

22. The system of claim 21 wherein said spirally shaped deviation sets radiate spirally from a common central deviation.

23. The system of claim 10 wherein said surface deviations are convex.

24. The system of claim 10 wherein said surface deviations are concave.

25. The system of claim 10 wherein said surface deviations include concave and convex deviations.

26. The system of claim 10 wherein said at least first and second surfaces of each of said plurality of air engaging vanes form a cavity region within said air engaging vanes; and wherein said plurality of air engaging vanes further include a plurality of solar energy collectors disposed within said cavity, for transforming light energy into electrical energy.

27. The system of claim 10 wherein said solar energy collectors include light sensitive solar cells.

28. A solar and wind energy generating system for mounting to a building, comprising:

at least one wind energy generating apparatus movably mounted to a building said wind energy generating apparatus movably mounted to a building including:

an auger shaped fluid medium engaging member, for effecting rotational movement in an electrical generator by intercepting the flow of a fluid medium, said auger shaped fluid medium engaging member mounted to a building comprising:

a helically shaped outer region disposed about a longitudinal axis which passes through a central region of said auger shaped fluid medium engaging member, said helically shaped outer region establishing at least one helically shaped fluid medium engaging surface, said auger shaped fluid medium engaging member adapted for rotational movement about said longitudinal axis, said flow of a fluid medium effecting said rotational movement of said auger shaped fluid medium engaging member upon striking said at least one helically shaped fluid medium engaging surface, for effecting rotational movement of said auger shaped fluid medium engaging member, and a solar energy generating apparatus mounted to a building.

29. The system of claim 28 wherein said at least one wind energy generating apparatus movably mounted to a building further includes:

a plurality of wind generators, each of said plurality of wind generators including a plurality of air engaging vanes having at least first and second surfaces, said air engaging vanes rotatably supported by said wind generator and operative for intercepting a flow of air currents for producing mechanical energy;

electric generator apparatus, coupled to each of said plurality of wind generators, for transforming said mechanical energy into electrical energy; and at least one of said first and second surfaces of each of said plurality of air engaging vanes including a plurality of surface deviations arranged in at least a first surface deviation pattern, said at least first surface deviation pattern including a plurality of deviation sets extending radially from a central point for forming said surface deviation patterns; and wherein said solar energy generating apparatus movably mounted to a building includes:

a plurality of solar energy collectors, responsive to light energy striking said plurality of solar energy collectors, for transforming light energy into electrical energy.

30. The system of claim 28 wherein said solar energy generating apparatus includes a plurality of solar energy collectors, responsive to light energy striking said plurality of solar energy collectors, for transforming light energy into electrical energy.

31. The system of claim 28 further including an electric vehicle recharging device, located proximate said building and responsive to said solar energy generating apparatus, for providing electrical energy for recharging at least one battery of said electric vehicle.

* * * * *